March 13, 1956 K. DANIEL 2,738,317

METHOD OF PRODUCING STAMPING POSITIVES FOR MECHANICAL PICK UP SOUND TAPES

Filed April 28, 1953

INVENTOR
KARL DANIEL

BY Mason, Porter, Diller & Stewart
ATTORNEYS 2,738,317

METHOD OF PRODUCING STAMPING POSITIVES FOR MECHANICAL PICK UP SOUND TAPES

Karl Daniel, Rosenhugel, Porz, near Cologne, Germany

Application April 28, 1953, Serial No. 351,727

2 Claims. (Cl. 204—5)

This invention relates to a method for the production of tape-like stamping positives for mechanical pick-up sound tapes.

Tapes carrying recorded sound are usually provided with grooves in which the sound is inscribed and which are separated by narrow marginal zones from the edges of the tapes. Such tapes are manufactured by inscribing the sound initially upon an endless wax tape. A master positive is produced from the wax tape by a galvanic method. Practical experience has shown that this master positive is unsuitable for the direct stamping of the final tapes for the reason that the wax tape recording is destroyed in the course of the manufacture of the master positive. Thus, the master positive constitutes the only record of the inscribed sound and as the master positive becomes unusable after relatively few stampings, the record is destroyed for good. For this reason it is advisable to produce a tape-like negative from the master positive, so that the master positive can be stored as a permanent record of the sound recording. From this master negative a second positive is produced which is hereinafter described as a stamping positive. This stamping positive can be made harder and be more durable than the first master positive. Furthermore, no particular care is required for using the stamping positive for the manufacture of the tape, since, should the stamping positive be destroyed, a new one can be conveniently made from the preserved master positive.

As already stated, the galvanic or galvano-plastic methods are used for the manufacture of the master positive from the wax tape and also for the manufacture of the negative from the master positive, as well as the manufacture of a stamping positive from the negative. It was found that in the course of these galvano-plastic operations, the marginal areas of the positive and negative tapes adhere one to the other with the resulting difficulties in manufacture.

An object of the present invention is to eliminate these difficulties and to produce a method of manufacturing stamping positives which will be more effective than methods used heretofore.

Another object is to make possible the repeated production of stamping positives from the same master positives despite the necessity of cutting off from the tapes the adhering marginal areas.

Other objects of the present invention will become apparent in the course of the following specification.

In attaining the objects of the present invention, it was found advisable to manufacture the master positive, the negative and also the stamping positive with broader unplayed edges than the edges of the sound tapes made from the stamping positives.

The adhesion of the unplayed marginal edges to one another is controlled in that only a portion of the unrecorded marginal areas is permitted to adhere to the positive or negative, while the remaining portions of the marginal areas are coated by a substance which prevents adhesion and which makes it possible for the two parts to be easily separated from each other upon the completion of the galvanic process.

The invention will appear more clearly from the following detailed description when taken in connection with the accompanying drawing, showing by way of example preferred embodiments of the inventive idea.

Figure 1:
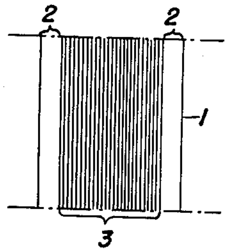
Figure 1 is a plan view showing a section of a completed tape used for sound reproduction and constituting the end product of the manufacturing method.

As already stated, the sound is initially recorded upon a wax tape. This wax tape is not shown in the drawing and it consists of sound tracks located in the middle of the tape and unplayed marginal areas. These marginal areas are considerably wider than the marginal areas 2 of the sound tape 1, which is the final article used for the reproduction of sounds. As shown in Fig. 1, the tape 1 has a sound inscribed section 3 extending between two unrecorded marginal areas 2. In the embodiment shown in Figs. 1 to 4, it may be assumed that the unplayed marginal areas of the wax tape are at least three times as wide as the marginal areas 2 of the sound tape 1.

Figure 2:
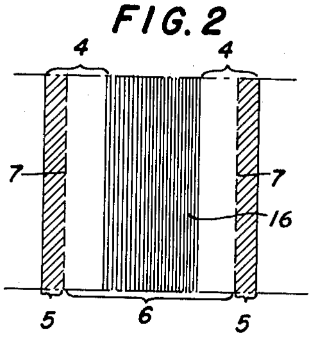
Figure 2 is a similar view of a master positive tape produced in accordance with the method of the present invention.

A galvano-plastic process is used to produce from the wax tape a master positive tape 16 shown in Fig. 2. This master positive tape 16 has unplayed marginal areas 4, the width of which is equal to that of the unplayed areas of the wax tape, namely, it is three times the width of the marginal areas 2 of the finished tape 1.

Figure 3:
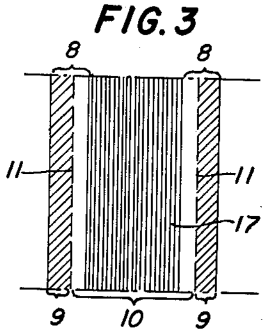
Figure 3 is a similar view of a negative tape produced from the master positive tape of Fig. 2.
Figure 4:
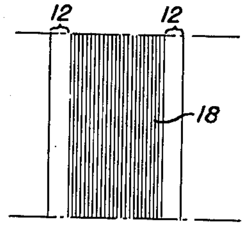
Figure 4 is a similar view of a stamping positive tape produced from the negative tape of Fig. 3.

A negative tape 17 shown in Fig. 3 is produced by galvanic deposition from the master positive tape 16. This galvanic method is carried out in such a manner that only the portions 5 of the marginal areas 4 are allowed to adhere to the the negative tape 17. In order to prevent the adherence of the remaining portions of the marginal areas, a suitable separating agent known per se is introduced between the two tapes. Thus, when the negative tape 17 has been completely formed, it will adhere to the master positive tape 16 only along the areas 5. Then these areas are cut off from the two tapes along the lines 7—7 of Fig. 2 with the result that the master positive tape 16 will be separated from the negative tape 17 of Fig. 3. As shown in Fig. 3, the completed negative tape 17 has unplayed marginal areas 8 which are narrower than the initial marginal areas 4 of the master positive tape 16 by about one-third.

Thereafter, a galvano-plastic method is used for making the stamping positive tape 18 from the negative tape 17. In the course of this process the stamping positive 18 will adhere to the negative 17 along the zone 9 of the negative 17. A separating agent will cover the remaining zone 10 of the negative 17, so as to prevent adherence within that zone. Upon completion of the stamping positive 18, the two tapes are separated by cutting off the tape zones 9 from the negative 17 along the lines 11—11. The completed stamping positive 18, shown in Fig. 4, has unplayed marginal areas 12 which are substantially equal in width to the marginal areas 2 of the final tape 1. It is apparent that the stamping positive 18 may be effectively employed for manufacturing the finished tape 1.

The number of stampings which can be undertaken with this stamping positive 18 depends primarily on the material from which the stamping positive 18 is made. However, even when extremely hard and resistant material is used for its manufacture, the number of sound tapes which can be produced from the positive 18 is limited. Therefore, if a larger number of sound tapes is required, it is necessary to produce a new stamping positive 18, and the stamping positive 18 can be produced only from the master positive tape 16 and the negative tape 17.

It is apparent, however, that the master positive 16 has become narrower by the zone 5 in the course of the manufacture of the negative tape 17. Similarly, the negative tape 17 has become narrower by the zone 9. Therefore, the described process makes it rather difficult to use the same master positive for the manufacture of a plurality of stamping positives.

Figure 5:
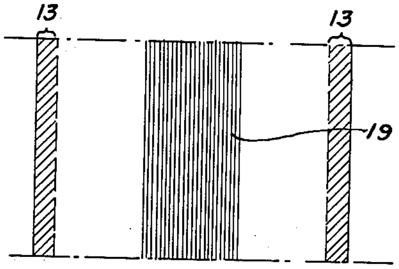
Figure 5 illustrates a master positive tape of a somewhat different form.
Figure 6:
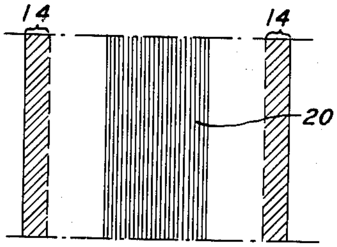
Figure 6 shows a negative tape produced from the master positive tape of Fig. 5.
Figure 7:
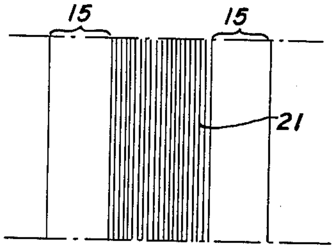
Figure 7 is a similar view of a stamping positive tape produced from the negative tape of Fig. 6.

These drawbacks are eliminated by the method which is illustrated diagrammatically in Figs. 5, 6 and 7. Fig. 5 shows a master positive tape 19, the marginal areas of which are considerably larger than those of the master positive tape 16 shown in Fig. 2. While the marginal areas of the master positive tape 16 are about three times as wide as the marginal areas 2 of the finished tape 1, the marginal areas of the master positive tape 13 are about five times as wide as the areas 2 of the tape 1. The negative tape 20 is produced from the master positive tape 19 in the described manner and at that time the master positive tape removes the areas 13 which adhered to the negative tape 20 in the course of its manufacture. Thereupon a stamping positive 21 shown in Fig. 7 is produced from the negative 20 which removes at that time the areas 14 which adhered to the stamping positive 21.

It is apparent that the stamping positive 21 has unrecorded marginal areas 15 which are about three times as wide as the marginal areas 2 of the finished sound tape 1. This greater width of the unrecorded marginal areas of the stamping positive has no detrimental effect upon the production of the sound tape 1 shown in Fig. 1.

If the first stamping positive tape 21 shown in Fig. 7 is used up or destroyed a sound stamping positive tape may be conveniently produced from the master positive tape 19, and the stamping positive tape will then have marginal areas which are twice as wide as the areas 2 of the final tape 1. If necessary, a third stamping positive tape can be made later on from the same master positive tape 19 and the width of the marginal areas of this third stamping positive tape will be equal in width to the width of the unrecorded marginal areas of the completed sound tape 1.

It is apparent that the invention shown above has been given solely by way of illustration and not by way of limitation and that it is subject to many variations and modifications within the scope of the present invention. All such variations and modifications are to be included within the scope of the present invention.

What is claimed is:

1. In a method of producing a tape-like stamping positive for a mechanical pick-up sound tape, the steps of producing galvano-plastically a master positive tape having a central recorded portion and unrecorded marginal edges the width of which is between three and five times the width of the marginal edges of the finished tape, producing by galvanic deposition a negative tape from said master positive tape while introducing a separating agent between predetermined inner portions of the marginal edges of the master positive tape and the negative tape to cause the master positive tape and the negative to adhere to each other only along the remaining outer portion of said marginal edges, said predetermined inner portions being wider than the marginal edges of the finished tape, cutting off said outer portions from said inner portions, whereby a negative tape is produced having marginal edges which are narrower than the marginal edges of the master positive tape and which are wider than the marginal edges of the finished tape, producing galvano plastically the stamping positive from said negative tape while introducing a separating agent between predetermined inner portions of the marginal edges of the negative tape and the stamping positive to cause the negative tape and the stamping positive to adhere to each other only along the remaining outer portions of said marginal edges, the last-mentioned inner portions being equal in width to the marginal edges of the finished tape, and cutting off the last-mentioned outer edges.

2. The method in accordance with claim 1, wherein the width of the marginal edges of the master positive tape is substantially five times the width of the marginal edges of the finished tape.

References Cited in the file of this patent

UNITED STATES PATENTS 2,385,595 Woitscheck ------------ Sept. 25, 1945

OTHER REFERENCES

Metal Industry, August 14, 1936, pages 165–169; September 4, 1936, pages 239–242; September 11, 1936, pages 265 and 266.